US006875378B1

(12) United States Patent
Higashida et al.

(10) Patent No.: US 6,875,378 B1
(45) Date of Patent: Apr. 5, 2005

(54) OPTICAL DISK MOLDING APPARATUS AND METHOD

(75) Inventors: Takaaki Higashida, Kadoma (JP); Shinji Kadoriku, Takarazuka (JP); Hiroshi Yutani, Katano (JP); Yoshio Maruyama, Kyoto (JP); Tokiharu Nakagawa, Hirakata (JP); Kazuo Inoue, Suita (JP); Yoshihiro Kawasaki, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/936,164

(22) PCT Filed: Mar. 10, 2000

(86) PCT No.: PCT/JP00/01455

§ 371 (c)(1),
(2), (4) Date: Sep. 10, 2001

(87) PCT Pub. No.: WO00/54957

PCT Pub. Date: Sep. 21, 2000

(30) Foreign Application Priority Data

Mar. 12, 1999 (JP) ............................................. 11-066255

(51) Int. Cl.[7] ..................... B29D 17/00; B28B 13/06; B29C 45/43; B29C 45/40; G11B 7/26
(52) U.S. Cl. ..................... 264/1.1; 264/1.33; 264/334; 264/335; 425/556; 425/DIG. 102
(58) Field of Search .............................. 264/334, 335, 264/336, 1.1, 1.33; 425/556, 517, DIG. 102

(56) References Cited

U.S. PATENT DOCUMENTS

| | | | |
|---|---|---|---|
| 4,540,359 A | | 9/1985 | Yamazaki |
| 4,615,669 A | | 10/1986 | Fujita et al. |
| 4,783,041 A | * | 11/1988 | Sakaida et al. ............. 249/103 |
| 4,988,273 A | | 1/1991 | Faig et al. |
| 5,316,466 A | | 5/1994 | Tanaka et al. |
| 5,376,317 A | * | 12/1994 | Maus et al. ................. 264/40.6 |
| 5,810,941 A | * | 9/1998 | Moynagh ....................... 134/4 |
| 5,840,352 A | | 11/1998 | Shimizu et al. |
| 5,882,700 A | * | 3/1999 | Asai ........................... 425/556 |
| 6,164,955 A | | 12/2000 | Kubota |

FOREIGN PATENT DOCUMENTS

| | | | |
|---|---|---|---|
| JP | 1-159223 | | 6/1989 |
| JP | 02-147221 | * | 6/1990 ........... B29C/43/50 |
| JP | 6-31782 | | 2/1994 |

(Continued)

OTHER PUBLICATIONS

Patent Abstracts of Japan, vol. 18, No. 135 (P–1705), Mar. 7, 1994 & JP 05 314546 A (Hitachi Maxell Ltd), Nov. 26, 1993.

*Primary Examiner*—J. A. Lorengo
(74) *Attorney, Agent, or Firm*—Wenderoth, Lind & Ponack, L.L.P.

(57) ABSTRACT

An optical disk molding apparatus and method are provided which prevent data formed on a molded object from being damaged and prevent quality deterioration of the molded object. There are provided a mold moving device, a first gas supply device, and a controller, whereby a first release space part is formed by opening molds from a mold clamp state by a movement distance not damaging a data transferred face of the optical disk, and a gas is supplied to the first release space part at a point in time when the first release space part is formed, thereby totally separating the optical disk and a stamper from each other. No damage is caused to a data transferred face at the point in time when the first release space part is formed. Since separation between the optical disk and the stamper is performed via pressure of the gas after the first release space part is formed, data is prevented from being damaged over the data transferred face of the optical disk in its entirety.

17 Claims, 9 Drawing Sheets

FOREIGN PATENT DOCUMENTS

| | | | | |
|---|---|---|---|---|
| JP | 06-031782 | * | 2/1994 | ........... B29C/45/43 |
| JP | 7-290527 | | 11/1995 | |
| JP | 8-25434 | | 1/1996 | |
| JP | 8-90617 | | 4/1996 | |
| JP | 08-207161 | * | 8/1996 | ........... B29D/17/00 |
| JP | 8-207161 | | 8/1996 | |
| JP | 9-155934 | | 6/1997 | |
| JP | 2000108169 | | 4/2000 | |

* cited by examiner

|  | MOVE DISTANCE (mm) | | | |
|---|---|---|---|---|
|  | 0.1 | 0.2 | 0.3 | 0.5 |
| GAS PRESSURE Pa 19.6 | × | × | × | × |
| 24.5 | ○ | ○ | × | × |
| 29.4 | ○ | ○ | × | × |
| 34.3 | ○ | ○ | ○ | × |
| 39.2 | ○ | ○ | ○ | × |

OPTICAL DISK MOLDING APPARATUS AND METHOD

This application is a Nation Stage application of PCT/JP00/01455, filed Mar. 10, 2000.

TECHNICAL FIELD

The present invention relates to an optical disk molding apparatus for molding and removing optical disks such as, for example, CDs (compact disks), LDs (laser disks) and the like, and a method for molding optical disks performed by the optical disk molding apparatus.

BACKGROUND ART

Figure 8:
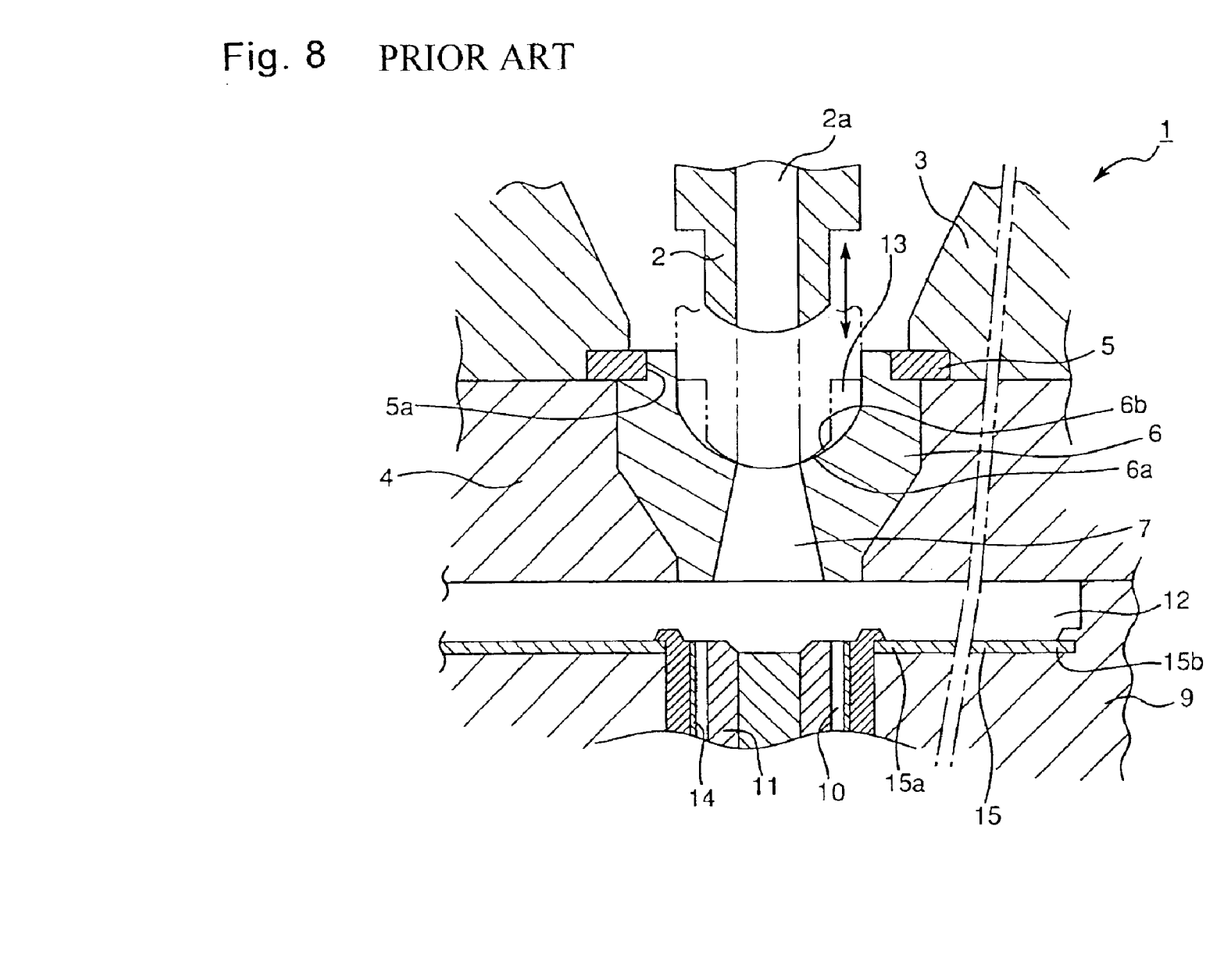
FIG. 8 is a diagram showing a constitution of a conventional optical disk molding apparatus.

A molding apparatus 1 having a structure as shown in FIG. 8 has been conventionally used for forming molded objects corresponding to, for instance, CDs, LDs and the like optical disks. The molding apparatus 1 of this type is roughly comprised of a nozzle 2 for injecting a plasticized molten resin to form molded objects, a fixed mold 4, and a movable mold 9. A cavity 12 into which the molten resin is injected to mold an object is formed between the fixed mold 4 and the movable mold 9.

The fixed mold 4 has a sprue bush 6 fitted thereto. The sprue bush 6 includes a recess part 13 into which the nozzle 2 can be inserted and removed, and a sprue part 7 for communicating with the recess part 13 and the cavity 12. The sprue bush 6 is positioned relative to the fixed mold 4 by being fitted at an inner circumferential face 5a of a locating ring 5 set to a fixed plate 3. The sprue part 7 is designed to be concentric with the locating ring 5 and the nozzle 2 when the sprue bush 6 is fitted in the locating ring 5.

Meanwhile, the movable mold 9 has a stamper 15 which is installed facing the cavity 12 and on which data to be transferred to the molded object are formed.

In the molding apparatus 1, for injecting the plasticized molten resin into the cavity 12, the nozzle 2 moves down and comes into contact with a contact face 6b of a bottom part 6a of the sprue bush 6, whereby an injection hole 2a of the nozzle 2 communicates with the sprue part 7. The plasticized molten resin is injected from the nozzle 2 by a plunger (or screw). This injected molten resin is injected via the sprue part 7 of the sprue bush 6 into the cavity 12. Pits and projections constituting the data of the stamper 15 are thus transferred to the molded object.

For releasing the molded object from the movable mold 9, simultaneously with when a mold opening operation is performed by driving the movable mold 9 after the resin is injected, air is blown to the molded object from a path 10 formed in the movable mold 9. Ejection of the sprue part 7 and the molded object is performed after the movable mold 9 is completely opened, with the air being simultaneously blown to the molded object from the path 10, thereby separating the molded object from the movable mold 9. The molded object is transferred to outside of the molding apparatus by a take-out apparatus after this separation is finished.

Figure 9:
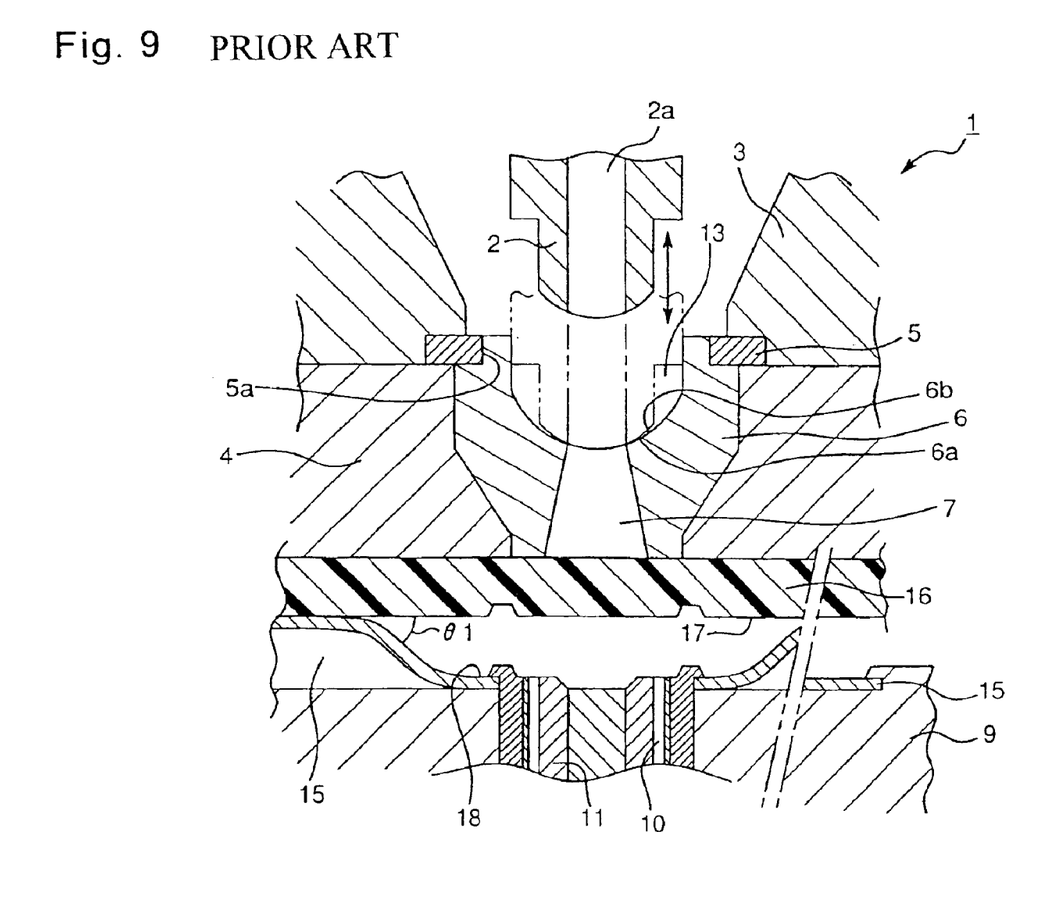
FIG. 9 is a diagram of a state in which an optical disk is released in the conventional optical disk molding apparatus of FIG. 8.

The conventional molding apparatus 1 of the above structure has problems as follows. Specifically, the stamper 15 and the molded object relatively tightly adhere to one another because of the molding operation performed for creating a molded object. As indicated in the right half of the movable mold 9 in FIG. 8, the stamper 15 is held to the movable mold 9 in a manner so that an inner circumferential part 15a and an outer circumferential part 15b of the stamper are caught by the movable mold 9. After a mold opening operation is performed after molding, as shown in FIG. 9, an ejector pin 11 projects from the movable mold 9, whereby the molded optical disk 16 is pushed up towards the fixed mold 4, and the optical disk 16 and the stamper 15 are separated from each other.

In an event that a middle part, between the inner circumferential part 15a and the outer circumferential part 15b in a diametrical direction of the stamper 15, is not released from the molded object 16 when the mold opening operation is performed, the stamper 15 is deformed so as to float away from a central part of the movable mold 9 as indicated in the drawing. The larger an angle θ 1 between a data transferred face 17 of the molded object 16, to which the data of the stamper 15 are to be transferred, and a data forming face 18 of the stamper 15, having pits and projections corresponding to the data, the more projection parts of the data forming face 18 rub side faces of projecting parts formed on the data transferred face 17, thereby deforming the data transferred face 17. There is a problem in that data cannot be correctly formed on the molded object 16 in consequence of this deformation, resulting in quality deterioration of the molded object in some cases. More specifically, deformation of the data transferred face 17 appears as a whitish phenomenon or a so-called jitter in a ROM (read only memory) when the ROM is constituted of the optical disk, and data is written exceeding an allowable range in a RAM (random access memory) when the RAM is constituted of the optical disk.

In the stamper 15, as described above, since the projection parts of the data forming face 18 are rubbed and worn, frequent replacement of extremely expensive stampers 15 becomes necessary to eliminate the above problem of the molded object and to maintain quality of the molded object, which leads to an increase of costs.

The present invention is devised to solve the above problems and has for its object to provide an optical disk molding apparatus and method which can prevent deterioration in quality of molded objects.

SUMMARY OF INVENTION

In order to achieve the aforementioned objective, an optical disk molding apparatus according to a first aspect of the present invention comprises a pair of molds to open and clamp, wherein a stamper having data to be transferred to an optical disk to be molded via the molds is provided at a cavity defined between the molds. The apparatus molds the optical disk in the cavity, and the molds are opened after molding the optical disk. The apparatus is characterized by comprising:

- a mold moving device having an electric motor for opening of the molds; and
- a gas supply device for supplying a gas to a release space part formed by releasing part of the molded optical disk from one of the molds by opening of the molds by the mold moving device so as to totally separate the optical disk and the one of the molds from each other via a pressure of the gas.

According to the optical disk molding apparatus of the first aspect, the molds are opened by the electric motor of the mold moving device and therefore can be opened by a minute movement amount in comparison with related art. The movement amount can be controlled more easily than in the related art. In other words, it becomes possible to supply the gas by the gas supply device to the release space part at a point in time when the movement amount in which the release space part is formed by the mold opening is attained. The gas is supplied to the release space part formed by the movement amount highly accurately controlled as compared with the related art, thereby peeling the optical disk from the one of the molds. A quality deterioration at least at one of a data transferred face and a data non-form face of the molded optical disk can be prevented accordingly.

The release space part may have a first release space part formed by releasing part of the optical disk from the stamper, and the gas supply device may have a first gas supply device for supplying the gas to the first release space part so as to totally separate the optical disk and the stamper from each other via pressure of the gas. The apparatus may further comprise a controller for controlling to drive the mold moving device and the first gas supply device, which causes the mold moving device to open the molds to separate the stamper and the optical disk, with a movement distance not damaging a data transferred face of the optical disk, from a mold clamp state in which the optical disk is molded so as to form the first release space part, and causes the first gas supply device to work to supply the gas to the first release space part at a point in time when the first release space part is formed.

By having the first gas supply device and the controller as above, the molds are opened by the movement distance, not damaging the data transferred face of the optical disk, from the mold clamp state in which the optical disk is molded, thereby forming the first release space part, and the gas is supplied to the first release space part when the first release space part is formed, so that the optical disk and the stamper are wholly separated from each other. No damage is therefore brought about to the data transferred face of the optical disk at the point in time when the first release space part is formed. Moreover, the optical disk and the stamper are separated from each other via the gas pressure after the first release space part is formed. Data is accordingly prevented, over an entirety of the data transferred face of the optical disk, from being damaged, and quality deterioration of the optical disk as a molded body can be prevented.

The movement distance by which the controller makes the mold moving device open the molds may be a mold open amount of 0.3 mm, or smaller, exceeding the mold clamp state.

The first release space part is formed to peel the optical disk by opening the molds by the above movement distance, whereby quality deterioration of the optical disk can be prevented.

The controller can make the gas supply device supply the gas with a pressure of $24.5 \times 10^4$ Pa or larger.

Quality deterioration of the optical disk can be prevented by performing a releasing operation via gas supply at the pressure.

An optical disk molding apparatus according to a second aspect of the present invention can be configured so that in the optical disk molding apparatus of the first aspect, the release space part has a second release space part formed by releasing part of a data non-form face, opposite to a data transferred face of the molded optical disk, from the other one of the molds by opening of the molds by the mold moving device, and the gas supply device has a second gas supply device for supplying gas to the second release space part so as to totally separate the data non-form face and the other one of the molds from each other via pressure of the gas.

According to the optical disk molding apparatus of the second aspect as above, because of installing the second gas supply device for supplying the gas to the second release space part, the data non-form face of the optical disk can be released from the other of the molds while the data non-form face is prevented from being deteriorated in quality.

In the optical disk molding apparatus of the above second aspect, the apparatus may be designed so that the molds have a movable mold movable by the mold moving device along a thickness direction of the optical disk to be molded, and a fixed mold arranged opposite to the movable mold, the stamper is fitted to the movable mold, and the controller further makes the mold moving device move the movable mold from a mold clamp state by a movement amount by which the second release space part is formed, and which is smaller than a movement amount for forming a first release space part by releasing part of the optical disk from the stamper, and makes the second gas supply device work to supply gas to the second release space part at a point in time when the second release space part is formed.

Since the controller also controls operation of the mold moving device and the second gas supply device, the data transferred face and the data non-form face of the optical disk can be released from the molds while quality deterioration is prevented for these two faces.

According to an optical disk molding method of a third aspect of the present invention, the method comprises molding an optical disk, and opening a pair of molds after molding the disk; the molds being opened and clamped and defining a cavity, with a stamper provided at the cavity and which has data to be transferred to the optical disk to be molded by the molds. The method is characterized by comprising:

opening the molds so as to separate the stamper and the optical disk from a mold clamp state in which the optical disk is molded, by a movement distance of 0.3 mm, or smaller, exceeding the mold clamp state so as not to damage a data transferred face of the optical disk; and supplying a gas to a first release space part at a point in time when the first release space part is formed between part of the optical disk and the stamper by releasing the optical disk from the stamper by opening of the molds, and then totally separating the optical disk and the stamper from each other.

The above optical disk molding method of the third aspect may be design ed so that the method further comprises:

forming a second release space part by releasing part of a data non-form face, opposite to the data transferred face of the molded optical disk, from one of the molds due to the opening of the molds before forming the first release space part;

totally separating the data non-form face and the one of the molds from each other by supplying a gas into the second release space part at a point in time when the second release space part is formed; and forming the first release space part after total separation of the data non-form face and the one of the molds from each other, thereby totally separating the optical disk and the stamper from each other.

BRIEF DESCRIPTION OF THE DRAWINGS

These and other objects and features of the present invention will become clear from the following description taken in conjunction with the preferred embodiments thereof with reference to the accompanying drawings in which.

DETAILED DESCRIPTION OF THE PREFERRED EMBODIMENTS

An optical disk molding apparatus, and an optical disk molding method which are embodiments of the present invention will be described below with reference to the drawings. It is to be noted here that like parts are designated by like reference numerals throughout the drawings. The optical disk molding method is performed by the optical disk molding apparatus.

First Embodiment

Figure 1:
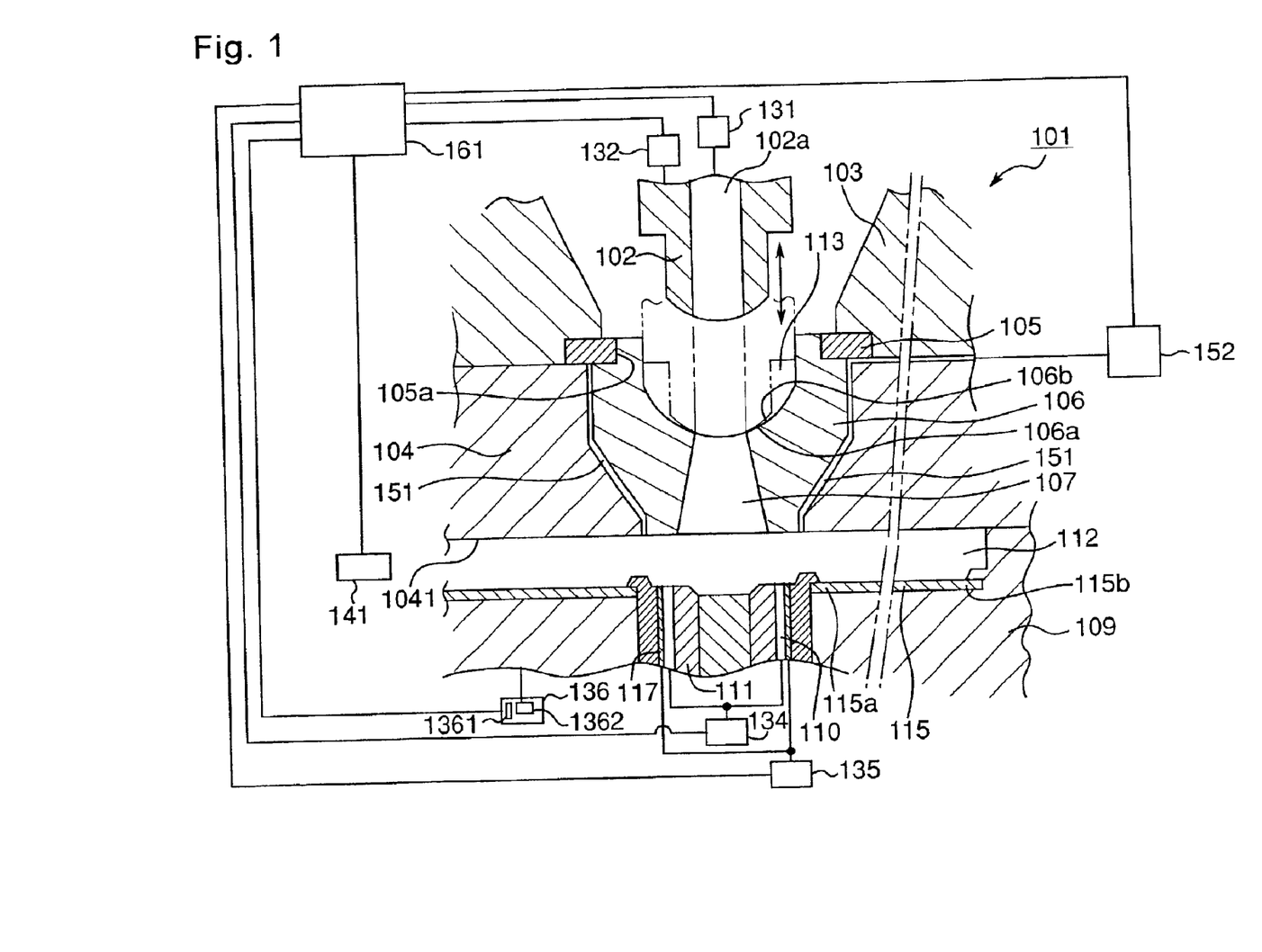
FIG. 1 schematically shows a constitution of an optical disk molding apparatus according to a first embodiment of the present invention.

FIG. 1 schematically shows a constitution of an optical disk molding apparatus 101 according to a first embodiment. As is shown in this drawing, although the optical disk molding apparatus 101 is fundamentally constructed in a similar manner to the above-described conventional optical disk molding apparatus 1, the optical disk molding apparatus 101 is characterized in that a gas supply system is installed also to a fixed mold, a moving device for moving a movable mold is improved, and a controller 161 for controlling operations of each part constituting the apparatus to perform an optical disk molding method to be detailed later is installed. The apparatus will be described in detail hereinbelow.

The optical disk molding apparatus 101 is constituted as follows. Specifically, the optical disk molding apparatus 101 is roughly comprised of a nozzle 102 for injecting a plasticized molten resin to mold optical disks as molded objects, a fixed mold 104, and a movable mold 109. A cavity 112 into which the molten resin is injected, thereby molding a molded object, is formed between the fixed mold 104 and the movable mold 109. The nozzle 102 has an injection unit 131 installed thereto. The injection unit 131 includes a plunger or a screw, and an arrangement necessary for injecting the plasticized molten resin. To the nozzle 102 is connected a nozzle moving device 132 so that the nozzle 102 is movable back and forth to a recess part 113, to be described below, along a thickness direction of an optical disk molded in the cavity 112. The above injection unit 131 and the nozzle moving device 132 are connected to the controller 161 and controlled to be driven by the controller 161.

A sprue bush 106 having the recess part 113, to which the nozzle 102 can move back and forth, and a sprue part 107 for communicating the recess part 113 with the cavity 112, is attached to the fixed mold 104. The sprue bush 106 is positioned to the fixed mold 104 by being fitted to an inner circumferential face 105a of a locating ring 105 set to a fixed plate 103. The sprue part 107 is adapted to be concentric with the locating ring 105 and the nozzle 102 when the sprue bush 106 is fitted into the locating ring 105.

Further, the fixed mold 104 has a second gas passage 151 formed therewith via utilization of a gap between the fixed mold and the sprue bush 106, and a gap part between the fixed mold and the fixed plate 103. One end of the second gas passage 151 is connected to a second gas supply device 152 installed outside the fixed mold 104, and another end of the second gas passage is opened to the cavity 112 circumferentially along a periphery of the sprue bush 106. The second gas supply device 152; which is connected to the controller 161 supplies, as will be discussed in detail later, air according to this embodiment through the second gas passage 151 to a gap part between a mirror face 1041 of the fixed mold 104 and part of the optical disk so as to separate the mirror face 1041 and the optical disk from each other after the optical disk is molded. The mirror face 1041 is a flat face for forming a data non-form face 177 of the optical disk to be molded.

A stamper 115, on which data to be transferred to the optical disk is formed, is provided at the movable mold 109 to face the cavity 112. Similar to stamper 15 described earlier, the stamper 115 is held to the movable mold 109 with an inner circumferential part 115a and an outer circumferential part 115b being caught by the movable mold 109. A mold moving device 136 for moving the movable mold 109 in the thickness direction of the optical disk molded in the cavity 112 is connected to the movable mold 109 for a purpose of a so-called mold opening operation and mold clamping operation. According to the present embodiment as will be described later, since it is necessary to move the movable mold 109 by several tenths of a millimeter or several micrometers during starting a mold opening operation, a toggle mechanism 1362 including an AC servo motor 1361 of an electric motor, as a driving source, and a ball screw are adopted for the mold moving device 136 in the embodiment. The movable mold 109 is moved by rotating the ball screw about an axis of the ball screw by the AC servo motor 1361. The movable mold 109 can hence be moved with an accuracy of a 1 µm level by adoption of this electric motor type toggle mechanism 1362.

A cylindrical cutter 117 is installed in the movable mold 109 correspondingly to a central part of the optical disk to be molded so as to form a through hole in the central part of the optical disk after molding thereof. The cylindrical cutter 117 is moved by a cutter driving device 135 along the thickness direction of the optical disk. The movable mold 109 also has a first gas passage 110 cylindrically formed corresponding to the central part of the optical disk and inside the cylindrical cutter 117. A first gas supply device 134 is connected to the first gas passage 110 for supplying air in this embodiment to the first gas passage 110. As will be detailed later, the first gas supply device 134 supplies the air through the first gas passage 110 to a gap part between the stamper 115 and the optical disk to separate the stamper 115 and the optical disk after the optical disk is molded.

A cylindrical ejector pin 111 is installed in the movable mold 109, which ejector pin relatively moves in a thickness direction of the movable mold 109, thereby projecting from or being stored in the movable mold 109 when the movable mold 109 moves in the thickness direction.

The above mold moving device 136, the cutter driving device 135, and the first gas supply device 134 are connected to the controller 161 and controlled to be driven by the controller 161.

The optical disk molding apparatus 101 further includes an optical disk take-out device 141 for removing from within the fixed mold 104 and the movable mold 109 the optical disk, molded and peeled subsequent to a mold opening operation of the movable mold 109, by the mold driving device 136. The optical disk take-out device 141 is connected to the controller 161 so as to be controlled in operation by the controller 161.

Operation of the optical disk molding apparatus 101 of the present embodiment constituted as above will be described below. Since operation in relation to molding the optical disk in the cavity 112 is not different from a conventional molding operation described before, description thereof will be omitted here. Characteristic operation of the apparatus of this embodiment with regard to the mold opening operation, and releasing of the molded optical disk from the stamper 115 after molding the optical disk, will be mainly described below.

Figure 3:
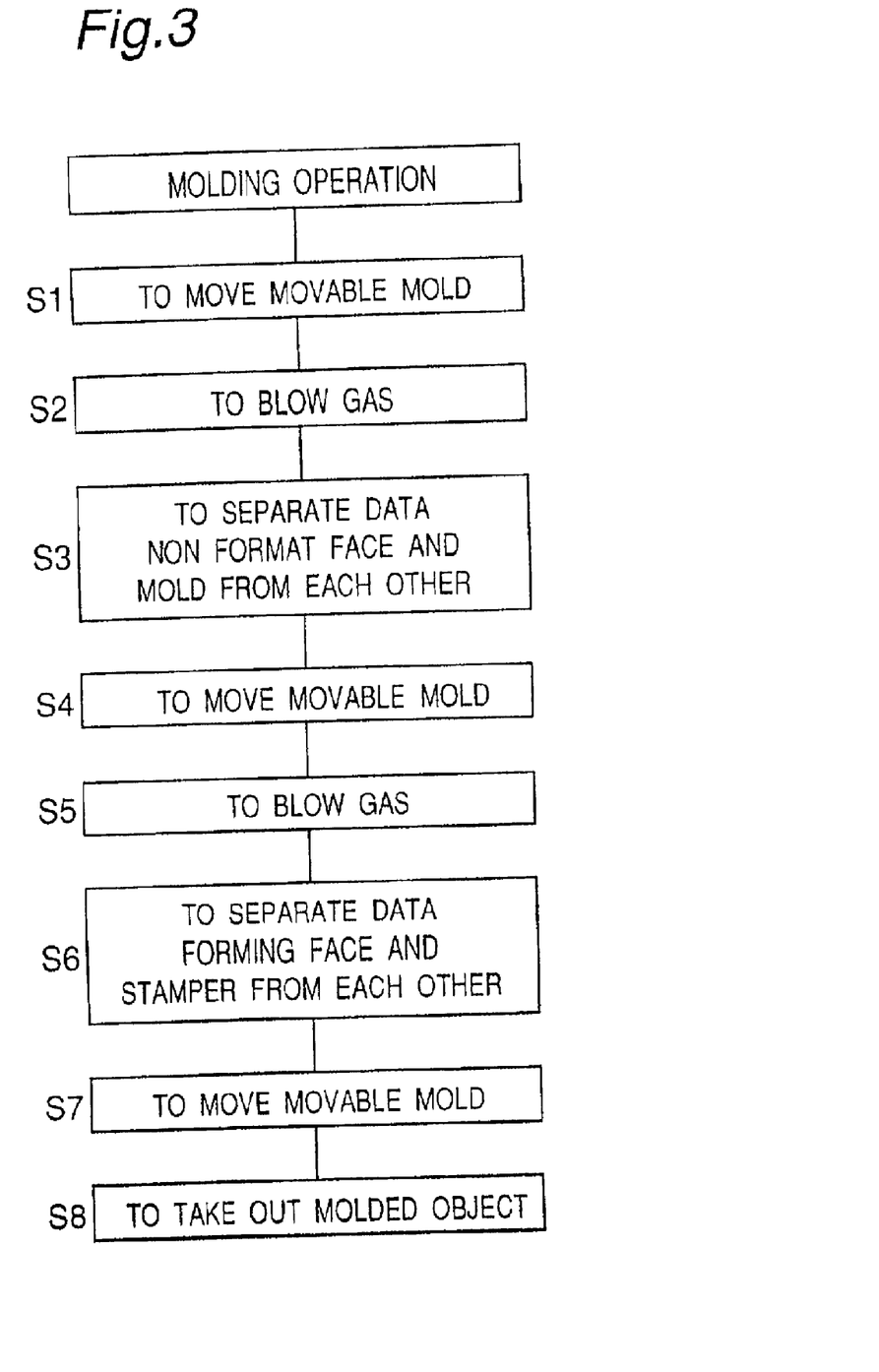
FIG. 3 is a flow chart of operations of an optical disk molding method performed by the optical disk molding apparatus of FIG. 1.

As shown in FIG. 3, after the optical disk is molded, the controller 161 drives the mold driving device 136 during a step (designated by "S" in the drawing) S1 to move the movable mold 109 in a direction of a mold opening operation, which is the thickness direction of the molded optical disk 16. A movement velocity of the movable mold 109 at this time is a first movement velocity to be described later, i.e., 2–3 mm/sec. The controller 161 drives the second gas supply device 152 at a point in time when the movable mold moves in the mold opening direction by approximately 20 $\mu$m in this embodiment from a mold clamp state in which the optical disk is molded, thereby supplying air through the second gas passage 151. In other words, as a result of the above movement by approximately 20 $\mu$m, a second release space part 176 is generated between part of the data nonform face 177 of the molded optical disk 16 and the mirror face 1041 of the fixed mold 104. The data non-form face 177 is exaggeratively illustrated for the sake of description in FIG. 7.

Next during step S2, the gas is supplied to the second release space part 176 at a point in time when the second release space part 176 is formed. The data non-form face 177 and the mirror face 1041 are entirely separated from each other via a pressure of gas supplied during step S3.

According to the present embodiment, air supply from the second gas supply device 152 is performed with an air pressure of 39.2×10$^4$ Pa for 0.1 second. The above approximately 20 $\mu$m, indicative of a timing for starting air supply, is a value set on a basis of the fact that a thickness tolerance of the optical disk 16 to be molded is ±10 $\mu$m. However, the value should be appropriately set in accordance with a change of an optical disk molding condition, and the like. A reason for supplying the gas to the second release space part 176 when the second release space part 176 is generated, thereby totally separating the data non-form face 177 from the mirror face 1041 is as described below.

Figure 7:
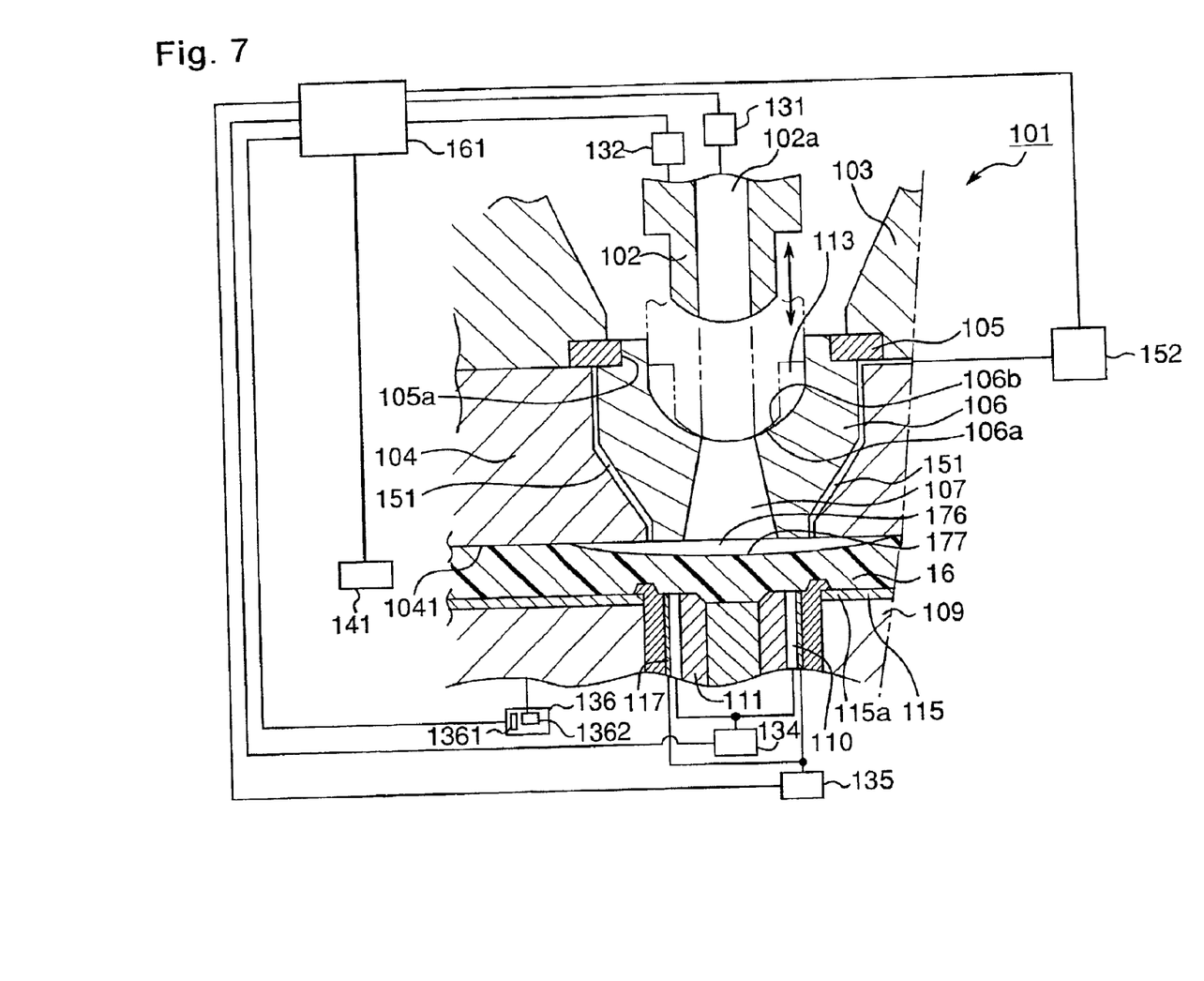
FIG. 7 is a diagram explanatory of a mold opening operation of the optical disk molding apparatus of the first embodiment.

If the data non-form face 177 and the mirror face 1041 are separated dependently on the mold opening operation without supplying the gas from the second gas supply device 152, this separation advances from a central part towards an outer circumferential part of the optical disk 16 and therefore, the outer circumferential part adheres to the mirror face 1041 until an end of the separation. In consequence, a time while the molded optical disk 16 is kept in contact with the mold varies in a diametrical direction thereof during a separation process, thereby causing a temperature difference of the optical disk 16 in the diametrical direction. As a result, the outer circumferential part of the optical disk 16 is not made to be transparent, but is hazed to raise problems in terms of appearance and quality of the optical disk. For preventing this phenomenon, the above gas supply from the second gas supply device 152 is performed when the second release space part 176 is formed, so that the data non-form face 177 and the mirror face 1041 are separated from each other at once, thus restricting a temperature difference to a minimum. The timing of starting the air supply can be considered as a timing whereat an appearance of the haze can be prevented.

Controlling to start the above gas supply at the point in time when the movable mold moves by a movement amount of approximately 20 $\mu$m is enabled by adopting the toggle mechanism 1362 having the AC servo motor 1361 as the mold driving device 136 as described before, thereby enabling control of a greatly minute movement amount in comparison with related art. Since control of a minute movement amount is enabled, gas supply can be started at the same time during each separation operation for each optical disk, and quality can be made to be uniform for each optical disk.

The gas supply from the second gas supply device 152 is started at a point in time when the mold opening operation is performed to a predetermined position according to the present embodiment as above, and although it is likely to be inferior to the present embodiment in terms of an effect of making quality uniform, air pressure may be applied as a modified example to the second gas passage 151 by the second gas supply device 152 before the mold opening operation is performed. The air pressure to be applied is of a level whereby the second release space part 176 is formed when the movable mold moves, e.g., by the above approximately 20 $\mu$m. The pressure is, for example, 39.2×10$^4$ Pa as mentioned before.

The phenomenon of an appearance of haze is easy to result particularly when the stamper 115 is provided at the movable mold 109. The stamper 115 is therefore preferably provided at the fixed mold 104 to avoid this problem of an appearance of haze as will be discussed later.

Figure 2:
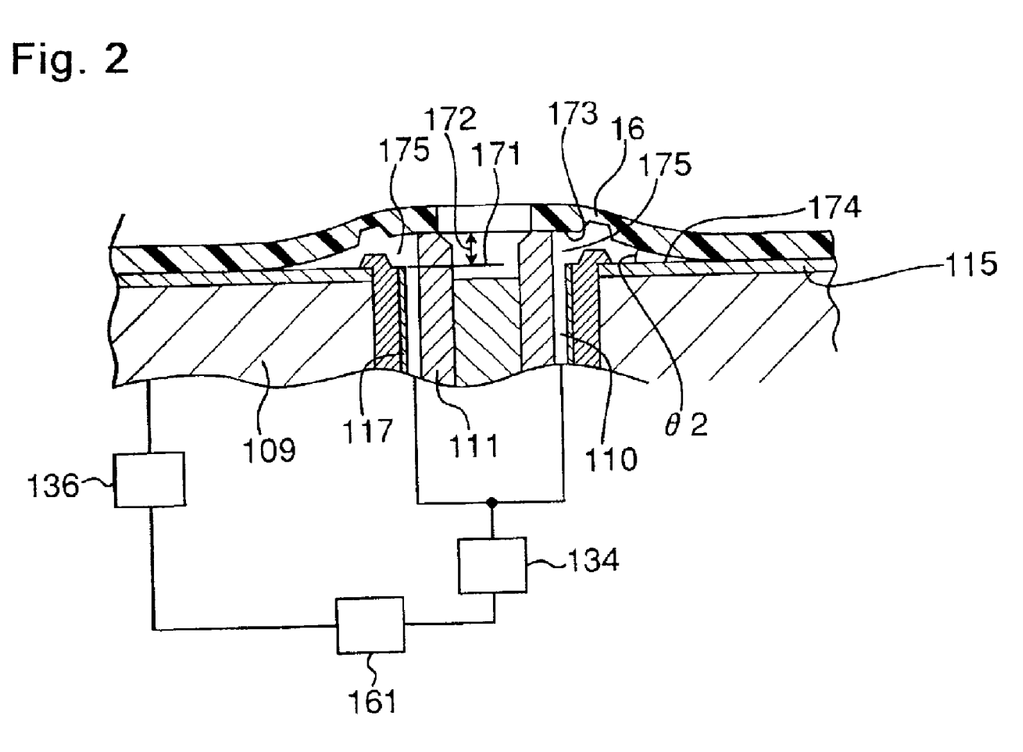
FIG. 2 is a sectional view of the optical disk molding apparatus of FIG. 1 in a state with a first release space part formed.

During step S4, the movable mold 109 is further moved in the mold opening direction to a preset origin position. Movement velocity at this time is a second movement speed to be described later which exceeds the above first movement velocity, namely, 200–300 mm/sec. The movable mold 109 is opened further to the origin position by a movement distance of 0.3 mm or smaller, that is, exceeding 0 and not larger than 0.3 mm. As shown in FIG. 2, by performing step S4 of the mold opening operation, the ejector pin 111 projects from a storage position 171, where the pin is stored in the movable mold 109, by the above movement distance 172 out of the movable mold 109. In other words, a value of the illustrated movement distance 172 becomes the aforementioned "exceeding 0 and not larger than 0.3 mm". The controller 161 sets the movement velocity of the movable mold 109 when the second release space part 176 is formed, and the first movement velocity when the movable mold is moved by the above movement distance 172, to be approximately 1% an output of the AC servo motor of the mold moving device 136, i.e., 2–3 mm/sec in the present embodiment.

When the movable mold 109 is opened by the above movement distance 172 "exceeding 0 and not larger than 0.3 mm", a first release space part 175 which is a gap of a minute amount is formed at the central part of the optical disk 16 between a data transferred face 173 of the optical disk 16 and a data forming face 174 of the stamper 115. Since a size in the thickness direction is smaller in a state when the first release space part 175 is formed, (that is, in a state when the movable mold 109 is opened by the controller 161 by the above move distance 172 of "exceeding 0 and not larger than 0.3 mm"), than a gap part formed in the related art, deformation of the stamper 15 as described with reference to FIG. 9 will not result. An angle θ 2 between the data transferred face 173 of the optical disk 16 and the data forming face 174 of the stamper 115 having pits and projections becomes smaller than angle θ 1 shown in FIG. 9. The data transferred face 173 is accordingly allowed to slip nearly in the thickness direction of the optical disk from the data forming face 174, so that side faces of projecting parts formed on the data transferred face 173 are prevented from being rubbed and deformed by projecting parts of the data forming face 174. Correct data can be formed on the optical disk 16 and quality deterioration of the optical disk does not occur.

Problems of the above haze phenomenon and a so-called jitter when a ROM is formed of the optical disk are solved, and a problem of data being written exceeding an allowable range when a RAM is formed of the optical disk is eliminated.

Since projection parts of the data forming face 174 of the stamper 115 are prevented from being rubbed and deformed, a replacement frequency of the stamper 115 is decreased and costs can be reduced.

The controller 161 drives the first gas supply device 134 during step S5 after performance of the mold opening operation of the movable mold 109 with the above movement distance 172, thereby supplying air to formed first release space part 175. At this time, the controller 161 controls pressure of the air to be supplied to not smaller than $24.5 \times 10^4$ Pa.

When the air with this thus-controlled pressure is supplied to the first release space part 175, the data transferred face 173 of the optical disk 16 and the data forming face 174 of the stamper 115 are totally separated from each other with this air pressure during step S6.

During step S7, the controller 161 again drives the mold moving device 136 to move the movable mold 109 in the mold opening direction. The controller 161 moves the movable mold 109 at this time at the second movement velocity, greater than the first movement velocity to finish the opening operation. The second movement velocity is approximately 0.100% an output of the AC servo motor of the mold moving device 136, i.e., 200–300 mm/sec in this embodiment. Since the electric motor type toggle mechanism is used as the mold moving device 136 in the embodiment as described above, the first movement velocity and the second movement velocity vary depending on structure of the mechanism. For instance, the second movement velocity can be set to be approximately 350 mm/0.4 sec.

During step S8, the controller 161 drives the take-out device 141, thereby removing the optical disk 16 from between the fixed mold 104 and the movable mold 109.

The controller 161 operates the mold moving device 136 thereafter to move the movable mold 109 in a mold clamp direction, and then returns to a molding operation for optical disks.

Figure 4:
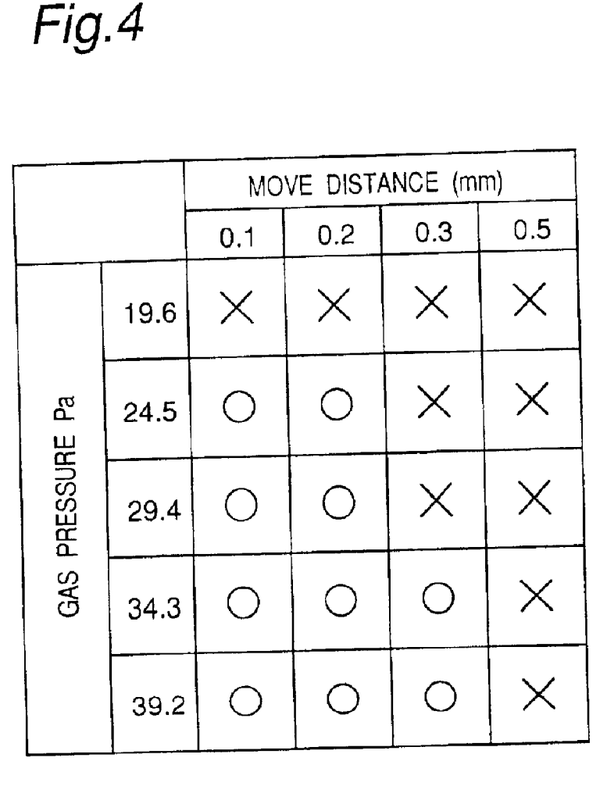
FIG. 4 is a diagram of results of experiments performed to obtain a movement distance of a movable mold and a supply gas pressure, whereby quality deterioration of optical disks is prevented during operation of the optical disk molding apparatus of FIG. 1.

The movement distance 172 of "exceeding 0 and not larger than 0.3 mm", and the pressure of the air supplied to the first release space part being 175 of $24.5 \times 10^4$ Pa or larger, are based on grounds as will be described with reference to FIG. 4. In FIG. 4, a circle mark represents non-existence of deformation at the data transferred face 173 of the optical disk 16 and an "X" mark represents existence of deformation.

As is clear from FIG. 4, the data transferred face 173 of the optical disk 16 is not deformed when the pressure of the air to be supplied to the first release space part 175 is not smaller than $24.5 \times 10^4$ Pa while the movement distance 172 is 0.1 mm, the data transferred face 173 is not deformed when the pressure of the air to be supplied to the first release space part 175 is not smaller than $24.5 \times 10^4$ Pa while the movement distance 172 is 0.2 mm, and the data transferred face 173 is not deformed when the pressure of the air to be supplied to the first release space part 175 is not smaller than $34.3 \times 10^4$ Pa while the movement distance 172 is 0.3 mm. In contrast, the data transferred face 173 of the optical disk 16 is deformed regardless of the pressure of the air supplied to the first release space part 175 when the movement distance 172 is 0.5 mm.

Based on the above experimental results, the movement distance 172 of "exceeding 0 and not larger than 0.3 mm", and the pressure of the air to be supplied to the first release space part being 175 of $24.5 \times 10^4$ Pa or larger, as described above are obtained. An upper limit of the air pressure is approximately $49 \times 10^4$ Pa in the present embodiment, which is based on a pressure of air supplied to a place where the optical disk molding apparatus is seated and which is determined according to a change of pressure at this seated place.

In the above embodiment, it is controlled so that the opening operation of the movable mold 109 is temporarily stopped after movement of the movable mold 109 during step S4 and air is supplied to the first release space part 175, and thereafter the movable mold 109 is opened during step S7 again. However, control is not limited to this manner, and the opening operation of the movable mold 109 can be performed continuously from step S4 to step S7 without a temporary stoppage halfway therebetween.

The above description relates to the movement distance 172 applied to a case where an optical disk for RAM is molded. On the other hand, in molding an optical disk for ROM, the movement distance 172 can be approximately 0.1 mm and gas is supplied with a pressure of approximately $19.6 \times 10^4$ Pa for about 0.5–1.0 second. A difference in the movement distance 172 corresponding to the RAM and the ROM results from a difference in structure of these optical disks. That is, the optical disk for RAM has a data record part formed of continuous projection parts and pit parts along a circumferential direction thereof, and therefore a gap between the stamper 115 and the optical disk 16, i.e., the above movement distance 172 should be secured sufficiently large to facilitate flowing supplied gas in the diametrical direction of the optical disk 16. On the other hand, since the optical disk for ROM has a data record part formed of discontinuous pit parts, namely, pits formed at intervals along a circumferential direction, there are gaps arranged towards an outer circumference. Therefore, supplied gas flows in the diametrical direction of the optical disk 16 even if the movement distance 172 is made smaller than in the case of RAM.

Second Embodiment

Figure 5:
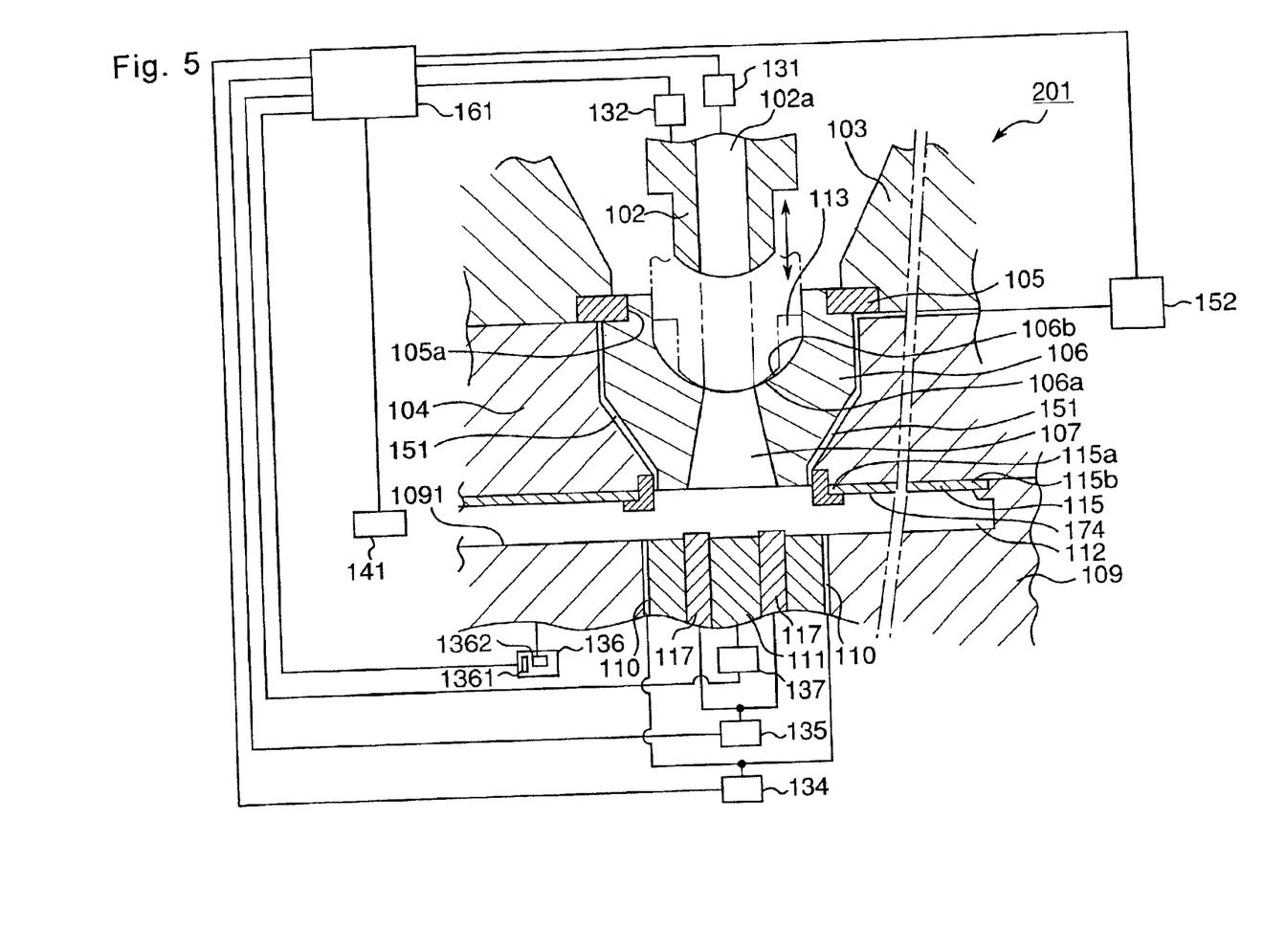
FIG. 5 schematically shows a constitution of an optical disk molding apparatus according to a second embodiment of the present invention.

Although the above embodiment adopts a movable stamper system having the stamper 115 provided at the movable mold 109, it is confirmed that the same result can be obtained in a fixed stamper system with stamper 115 mounted to fixed mold 104.

More specifically, stamper 115 is provided at fixed mold 104 in structure of an optical disk forming apparatus 201 shown in FIG. 5 of a second embodiment. Although ejector pin 111, cylindrical cutter 117 and first gas passage 110 of movable mold 109 are slightly different in arrangement from those in the foregoing optical disk forming apparatus 101, this difference does not constitute a specific feature. In the optical disk forming apparatus 201 having the stamper 115 provided at the fixed mold 104, operation opposite to operation of the optical disk forming apparatus 101 is performed regarding release of the optical disk described with reference to FIG. 3. That is, steps S4–S6 are performed first and steps S1–S3 are performed next. More specifically, the movable mold 109 is moved in a mold opening direction by the movement distance 172 from the mold clamp state, thereby forming first release space part 175 as a gap between data forming face 174 of the stamper 115 provided at the fixed mold 104 and part of data transferred face 173 of the optical disk 16, e.g., a central part of the optical disk. Air is supplied from second gas supply device 152 to the first release space part 175 similar to the case where air is supplied from first gas supply device 134 to the first release space part 175, whereby the data transferred face 173 of the optical disk 16 and the data forming face 174 of the stamper 115 are wholly separated from each other.

Similar to the case of the optical disk forming apparatus 101 described earlier, side faces of projection parts formed on the data transferred face 173 of the optical disk 16 will not be rubbed and deformed by projection parts of the data forming face 174 of the stamper 115, so that correct data is formed on the optical disk 16, while generating no quality deterioration of the optical disk. Further, the problems of the above-referred haze phenomenon and the so-called jitter, and the problem of writing data exceeding an allowable range, are eliminated. Moreover, costs can be reduced because of a decrease in replacement frequency of the stamper 115.

Second release space part 176 is generated between data non-form face 177 of the optical disk 16 and part of a mirror face 1091 of the movable mold 109, corresponding to the above mirror face 1041, by moving the movable mold 109 and pushing of the optical disk by the ejector pin 111 through relative movement. Air is supplied from the first gas supply device 134 to the second release space part 176 similar to the case of supplying the air from second gas supply device 152 to the second release space part 176, thereby entirely separating the data non-form face 177 of the optical disk 16 and the mirror face 1091 of the movable mold 109 from each other.

When the stamper 115 is mounted to the fixed mold 104, as described above, the data transferred face 173 of the optical disk 16 and the data forming face 174 of the stamper 115 are first totally released, and the optical disk 16 is cooled by such release. Therefore, control of a movement amount for generating the second release space part 176 to avoid the above-described appearance of haze is not particularly needed, although it may be executed. Accordingly, in structure with the stamper 115 provided at the fixed mold 104, an effect of eliminating a need of control for preventing an appearance of haze can be obtained in addition to an effect of preventing quality deterioration. When the fixed mold 104 is positioned in a direction opposite to gravity applied to the movable mold 104 as in the present second embodiment, a further effect of dust or the like falling, for example, from nozzle 102 is hard to realize.

Figure 6:
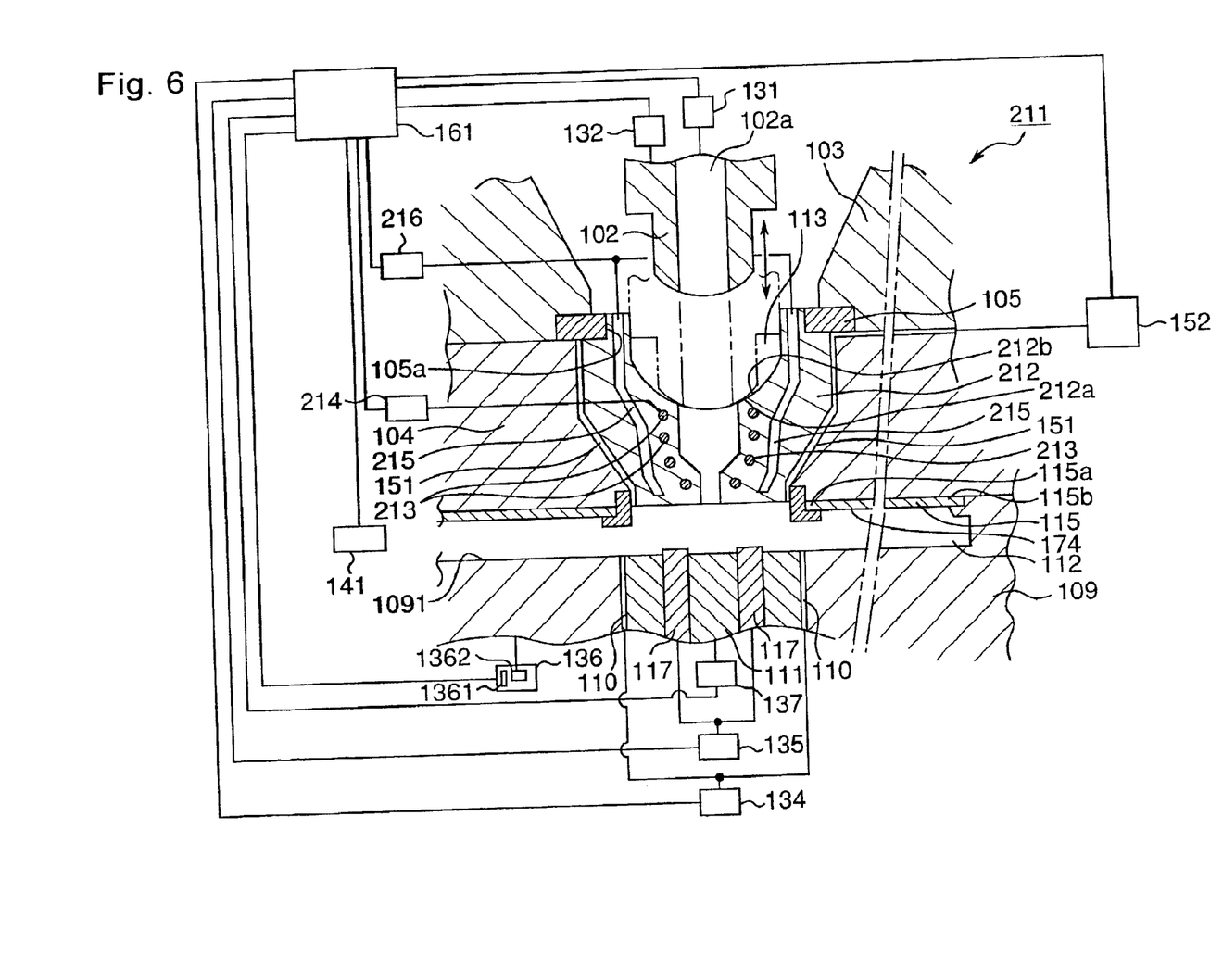
FIG. 6 is a diagram of a modification of the first embodiment and the second embodiment.

The optical disk forming apparatus 101 of the first embodiment and the optical disk forming apparatus 201 of the second embodiment described above are so-called cold runner types without having a heating device installed in a portion of the sprue bush part 106. However, a hot runner type with such a heating device can be adopted as shown in FIG. 6. Specifically, FIG. 6 shows an optical disk forming apparatus 211 obtained by turning the above optical disk forming apparatus 201 into a hot runner type. In the optical disk forming apparatus 211, a coil 213 for heating, e.g., an electromagnetic induction type is buried in a sprue bush 212 corresponding to the sprue bush 106, and also a coolant path 215 is formed through which, for example, water is fed to cool the sprue bush 212 if temperature of the sprue bush extraordinarily increases. The heating coil 213 is connected to a power source device 214, and the power source device 214 is controlled in operation by controller 161. A coolant supply device 216 which at least supplies coolant, and is controlled in operation by the controller 161, is connected to the coolant path 215. Temperature of the sprue bush 212 is controlled by controlling operation of the power source device 214 and the coolant supply device 216 by the controller 161.

In the above first embodiment and second embodiment, gas is supplied both to the first release space part 175 formed between part of the data transferred face 173 of the optical disk 16 and the data forming face 174 of the stamper 115, and to the second release space part 176 formed between the data non-form face 177 of the optical disk 16 and the mirror face of the mold. However, such an arrangement is possible in which gas is supplied to at least one of the spaces, more preferably, gas is supplied at least to the first release space part 175.

The entire disclosure of Japanese Patent Application No. 11-66255 filed on Mar. 12, 1999 including the specification, claims, drawings and abstract is incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for removing an optical disk from a molding apparatus, wherein the molding apparatus includes
(i) a first mold and a second mold defining a cavity therebetween, and
(ii) a stamper within the cavity, the stamper having data to be transferred to material that is to be molded into the optical disk within the cavity, and the material is molded into the optical disk within the cavity when the first and second molds are in a closed position such that the stamper becomes attached to the optical disk, said method comprising:

relatively moving said first and second molds away from said closed position by a first distance such that a first release space part is formed by causing a first part of said optical disk to be separated from one of said first mold and said stamper;

supplying a gas to said first release space part such that said optical disk becomes completely separated from said one of said first mold and said stamper; then further relatively moving said first and second molds away from said closed position by a second distance such that a second release space part is formed by causing a second part of said optical disk to be separated from the other of said first mold and said stamper, wherein a sum of said first distance and said second distance is about 0.3 mm; and supplying a gas to said second release space part such that said optical disk becomes completely separated from said other of said first mold and said stamper.

2. The method according to claim 1, wherein said first release space part is formed by causing said first part of said optical disk to be separated from said first mold, and said second release space part is formed by causing said second part of said optical disk to be separated from said stamper.

3. The method according to claim 2, wherein supplying a gas to said second release space part comprises supplying said gas to said second release space part with a pressure of at least $24.5 \times 10^4$ Pa such that said optical disk becomes completely separated from said stamper.

4. The method according to claim 3, wherein relatively moving said first and second molds away from said closed position by 1a first distance such that a first release space part is formed comprises relatively moving said first and second molds away from said closed position by about 20 μm.

5. The method according to claim 4, wherein further relatively moving said first and second molds away from said closed position by a second distance such that a second release space part is formed comprises further relatively moving said first and second molds away from said closed position by at most 0.3 mm.

6. The method according to claim 3, wherein further relatively moving said first and second molds away from said closed position by a second distance such that a second release space part is formed comprises further relatively moving said first and second molds away from said closed position by at most 0.3 mm.

7. The method according to claim 2, wherein relatively moving said first and second molds away from said closed position by a first distance such that a first release space part is formed comprises relatively moving said first and second molds away from said closed position by about 20 μm.

8. The method according to claim 7, wherein further relatively moving said first and second molds away from said closed position by a second distance such that a second release space part is formed comprises further relatively moving said first and second molds away from said closed position by at most 0.3 mm.

9. The method according to claim 2, wherein further relatively moving said first and second molds away from said closed position by a second distance such that a second release space part is formed comprises further relatively moving said first and second molds away from said closed position by at most 0.3 mm.

10. The method according to claim 1, wherein said first release space part is formed by causing said first part of said optical disk to be separated from said stamper, and said second release space part is formed by causing said second part of said optical disk to be separated from said first mold.

11. The method according to claim 10, wherein supplying a gas to said first release space part comprises supplying said gas to said first release space part with a pressure of at least $24.5 \times 10^4$ Pa such that said optical disk becomes completely separated from said stamper.

12. The method according to claim 11 wherein relatively moving said first and second molds away from said closed position by a first distance such that a first release space part is formed comprises relatively moving said first and second molds away from said closed position by at most 0.3 mm.

13. The method according to claim 12, wherein further relatively moving said first and second molds away from said closed position by a second distance such that a second release space part is formed comprises relatively moving said first and second molds away from said closed position by about 20 μm.

14. The method according to claim 11, wherein further relatively moving said first and second molds away from said closed position by a second distance such that a second release space part is formed comprises relatively moving said first and second molds away from said closed position by about 20 μm.

15. The method according to claim 10, wherein relatively moving said first and second molds away from said closed position by a first distance such that a first release space part is formed comprises relatively moving said first and second molds away from said closed position by at most 0.3 mm.

16. The method according to claim 15, wherein further relatively moving said first and second molds away from said closed position by a second distance such that a second release space part is formed comprises relatively moving said first and second molds away from said closed position by about 20 μm.

17. The method according to claim 10, wherein further relatively moving said first and second molds away from said closed position by a second distance such that a second release space part is formed comprises relatively moving said first and second molds away from said closed position by about 20 μm.

* * * * *

UNITED STATES PATENT AND TRADEMARK OFFICE
CERTIFICATE OF CORRECTION

PATENT NO. : 6,875,378 B1
DATED : April 5, 2005
INVENTOR(S) : Takaaki Higashida et al.

It is certified that error appears in the above-identified patent and that said Letters Patent is hereby corrected as shown below:

Column 13,
Line 20, change "1*a*" to -- a --.

Column 14,
Line 16, add -- , -- after "11".

Signed and Sealed this

Thirtieth Day of August, 2005

JON W. DUDAS
*Director of the United States Patent and Trademark Office*